(12) United States Patent
Chaudhry et al.

(10) Patent No.: US 11,952,753 B2
(45) Date of Patent: Apr. 9, 2024

(54) MECHANICALLY ACTUATED VALVE ASSEMBLIES

(71) Applicant: Rheem Manufacturing Company, Atlanta, GA (US)

(72) Inventors: Raheel A. Chaudhry, Montgomery, AL (US); Michael C. Mitchell, Auburn, AL (US); Michael C. Ezell, Montgomery, AL (US); Troy Trant, Montgomery, AL (US)

(73) Assignee: Rheem Manufacturing Company, Atlanta, GA (US)

( * ) Notice: Subject to any disclaimer, the term of this patent is extended or adjusted under 35 U.S.C. 154(b) by 861 days.

(21) Appl. No.: 17/008,799

(22) Filed: Sep. 1, 2020

(65) Prior Publication Data

US 2022/0064916 A1 Mar. 3, 2022

(51) Int. Cl.
  *E03B 7/07* (2006.01)
  *F16L 55/10* (2006.01)
  *G01M 3/18* (2006.01)
  *F24H 9/20* (2022.01)

(52) U.S. Cl.
  CPC .......... *E03B 7/071* (2013.01); *F16L 55/1022* (2013.01); *G01M 3/183* (2013.01); *G01M 3/184* (2013.01); *F16L 2201/30* (2013.01); *F24H 9/2007* (2013.01); *Y10T 137/5762* (2015.04)

(58) Field of Classification Search
  CPC .... E03B 7/071; F16K 17/36; Y10T 137/5762; F24H 9/2007
  USPC ............................................ 122/507
  See application file for complete search history.

(56) References Cited

U.S. PATENT DOCUMENTS

| 3,473,553 | A * | 10/1969 | Collins ............... F24H 9/17 122/504 |
| 3,712,327 | A * | 1/1973 | Pagenkopf ............ F17D 5/00 307/118 |
| 6,253,785 | B1 * | 7/2001 | Shumake, Jr. ........ F16K 21/18 122/504 |
| 6,276,309 | B1 * | 8/2001 | Zeek ................... F24H 15/31 122/504 |
| 6,336,469 | B1 * | 1/2002 | Nixon ................ F24H 9/2007 122/504 |
| 6,675,826 | B1 * | 1/2004 | Newman ............. F16K 31/082 307/118 |
| 7,562,673 | B1 * | 7/2009 | Martin ............... F16K 31/001 122/504 |
| 10,753,647 | B2 * | 8/2020 | Gardner .............. F24H 9/2007 |

* cited by examiner

*Primary Examiner* — Kevin F Murphy
(74) *Attorney, Agent, or Firm* — Eversheds Sutherland (US) LLP

(57) ABSTRACT

The disclosed technology includes a valve assembly having a valve, an actuating system, and a trigger. The trigger can be in mechanical communication with the actuating system and the actuating system can be in mechanical communication with the valve. The trigger can be positioned such that the trigger can interact with liquid resulting from a leak in a plumbing system, and upon interaction with liquid, the trigger can release the actuating system such that the actuating system can cause the valve to transition from an open position to a closed position. In the closed position, the valve can restrict the passage of liquid through the plumbing system such that the leak can be mitigated or stopped.

7 Claims, 11 Drawing Sheets

MECHANICALLY ACTUATED VALVE ASSEMBLIES

FIELD OF THE DISCLOSURE

The present invention relates generally to valve assemblies, and more particularly, to valve assemblies capable of detecting and preventing or mitigating a water leak.

BACKGROUND

Residential homes and commercial entities can have various plumbing systems and devices capable of storing and handling water, including water heaters, washing machines, dishwashers, sinks, and the like. Failures of such systems and appliances can be a significant source of water loss and damage. For example, a single crack having a diameter of only one-eighth inch in residential plumbing can result in a loss of water upwards of 250 gallons per day. Because of the significant damage and financial costs that can result from water leaks, it can be critical to quickly and effectively detect and stop a water leak.

One method of detecting and minimizing a water leak can include a powered valve. A powered valve can include one or more sensors configured to detect the presence of water from a leak and send a detection signal to a controller. In response, the controller can send a signal to an actuator to close a valve. However, powered valves that rely on electronic-based actuation can present several disadvantages. For example, a water leak can sometimes result in the powered valve shorting. When this occurs, the powered valve can become inoperable due to its reliance on power. Additionally, a situation can arise in which power is unavailable, such as a power outage or when replacing a liquid storage device. When power is unavailable, the powered valve cannot automatically shut off a plumbing system or device in response to a leak.

Additionally, some valve assemblies use a single-use, one-time actuation method when detecting a water leak and subsequently shutting off the flow of water. In this configuration, the same valve assembly cannot be used to detect and minimize any subsequent leaks, thereby causing increased costs and increased installation time of new valve assembly components.

SUMMARY

These and other problems can be addressed by the technologies described herein. Examples of the present disclosure relate generally to a valve assembly for detecting and mitigating a water leak in a plumbing assembly without the use of electrical power.

The disclosed technology includes a valve assembly including a valve, a trigger, an actuating system, and a tension member. The valve can be configured to transition from an open position to a closed position. The open position can permit passage of liquid through a plumbing assembly. The closed position can restrict passage of liquid through the plumbing assembly. The actuating system can be in mechanical communication with the valve and can include at least one energy storage device configured to store energy when the valve is in the open position. The trigger can be configured to detect the liquid proximate to a base of a liquid storage device by transitioning from a dry state to a hydrated state in response to interacting with the liquid. The tension member can mechanically connect the actuating system and the trigger. The trigger can be configured to restrict movement of the tension member such that, when the valve is in the open position, the energy stored by the energy storage device creates tension in the tension member. The trigger can be configured to structurally fail when the trigger is in the hydrated state, thereby releasing the tension member and permitting the energy storage device to release the energy. By releasing the energy, the valve can transition from the open position to the closed position. Upon the valve closing, the leak can be mitigated by preventing continued flow of the liquid to the leak location.

The valve can include a ball valve.

The trigger can be positioned within a recess of a trigger housing of the liquid storage device.

The tension member can have a length that is approximately equal to a height of the liquid storage device.

The tension member can include a rigid member. The tension member can include a non-rigid member.

The trigger can include a liquid-soluble material.

The energy storage device can include at least one of a torsion spring, a compression spring, and a tension spring.

The actuating system can further include a hammer in mechanical communication with a first energy storage device of the at least one energy storage devices and a first end of the tension member. The hammer can be configured to transition from a first position to a second position upon the first energy storage device releasing stored energy. The actuating system can include an actuator in mechanical communication with the hammer via the first energy storage device and in mechanical communication with the valve via a second energy storage device. The actuator can be configured to transition the valve from the open position to the closed position. The actuating system can include a latching pawl in mechanical communication with the actuator via the second energy storage device and configured to disengage from the actuator upon the hammer transitioning from the first position to the second position.

The trigger can be a first trigger that is configured to insert into a recess of a trigger housing, and subsequent to the first trigger transitioning to the hydrated state, a second trigger can be configured to insert into the recess.

The disclosed technology also includes a valve assembly including a valve, a sensor, an electronically controlled valve, and an actuating system. The valve can be configured to transition from an open position to a closed position. The open position can permit passage of liquid through a plumbing assembly. The closed position can restrict passage of the liquid through the plumbing assembly. The sensor can be configured to detect a presence of the liquid. The electronically controlled valve can be in electrical communication with the sensor. In response to the sensor detecting the presence of the liquid, the electronically controlled valve can transition from a closed position to an open position. The actuating system can be in mechanical communication with the electronically controlled valve and the valve. The actuating system can include an energy storage device configured to store energy when the valve is in the open position and release energy to close the valve when the electronically controlled valve transitions from the closed position to the open position. Upon the valve closing, the leak can be mitigated by preventing continued flow of the liquid to the leak location.

The valve assembly can further include a controller configured to receive a signal from the sensor indicating the presence of the liquid and output a signal to the electronically controlled valve to transition from the closed position to the open position.

The valve assembly can further include a sound device configured to emit an audible alarm in response to the sensor detecting the presence of the liquid.

The sensor can be disposed proximate the base of the liquid storage device.

The electronically controlled valve can be battery powered.

The electronically controlled valve can include a solenoid valve.

The energy storage device can include at least one of a torsion spring, a tension spring, and a compression spring.

The actuating system can further include a retention latch configured to transition from a first position to a second position upon the electronically controlled valve transitioning from the closed position to the open position. The energy storage device can be configured to release energy upon the retention latch transitioning from the first position to the second position.

The actuating system can further include a lever configured to rotate from a first position to a second position upon the energy storage device releasing energy and the retention latch transitioning from the first position to the second position.

The disclosed technology also includes a liquid heating device including an inlet for receiving unheated liquid, an outlet for outputting heated liquid, and a leak mitigation assembly disposed proximate the inlet. The leak mitigation assembly can include a valve, a trigger, an actuating system, and a tension member. The valve can be configured to transition from an open position to a closed position. The open position can permit passage of liquid through the liquid heating device. The closed position can restrict passage of liquid through the liquid heating device. The actuating system can be in mechanical communication with the valve and can include an energy storage device configured to store energy when the valve is in the open position. The trigger can be configured to detect the liquid proximate to a base of the liquid heating device by transitioning from a dry state to a hydrated state in response to interacting with the liquid. The tension member can mechanically connect the actuating system and the trigger. The trigger can be configured to restrict movement of the tension member such that, when the valve is in the open position, the energy stored by the energy storage device creates tension in the tension member. The trigger can be configured to structurally fail when the trigger is in the hydrated state, thereby releasing the tension member and permitting the energy storage device to release the energy. By releasing the energy, the valve can transition from the open position to the closed position.

These and other aspects of the present disclosure are described in the Detailed Description below and the accompanying figures. Other aspects and features of the present disclosure will become apparent to those of ordinary skill in the art upon reviewing the following description of specific examples of the present disclosure in concert with the figures. While features of the present disclosure may be discussed relative to certain examples and figures, all examples of the present disclosure can include one or more of the features discussed herein. Further, while one or more examples may be discussed as having certain advantageous features, one or more of such features may also be used with the various other examples of the disclosure discussed herein. In similar fashion, while examples may be discussed below as devices, systems, or methods, it is to be understood that such examples can be implemented in various devices, systems, and methods of the present disclosure.

BRIEF DESCRIPTION OF THE FIGURES

Reference will now be made to the accompanying figures, which are not necessarily drawn to scale, and wherein.

DETAILED DESCRIPTION

Figure 1A:
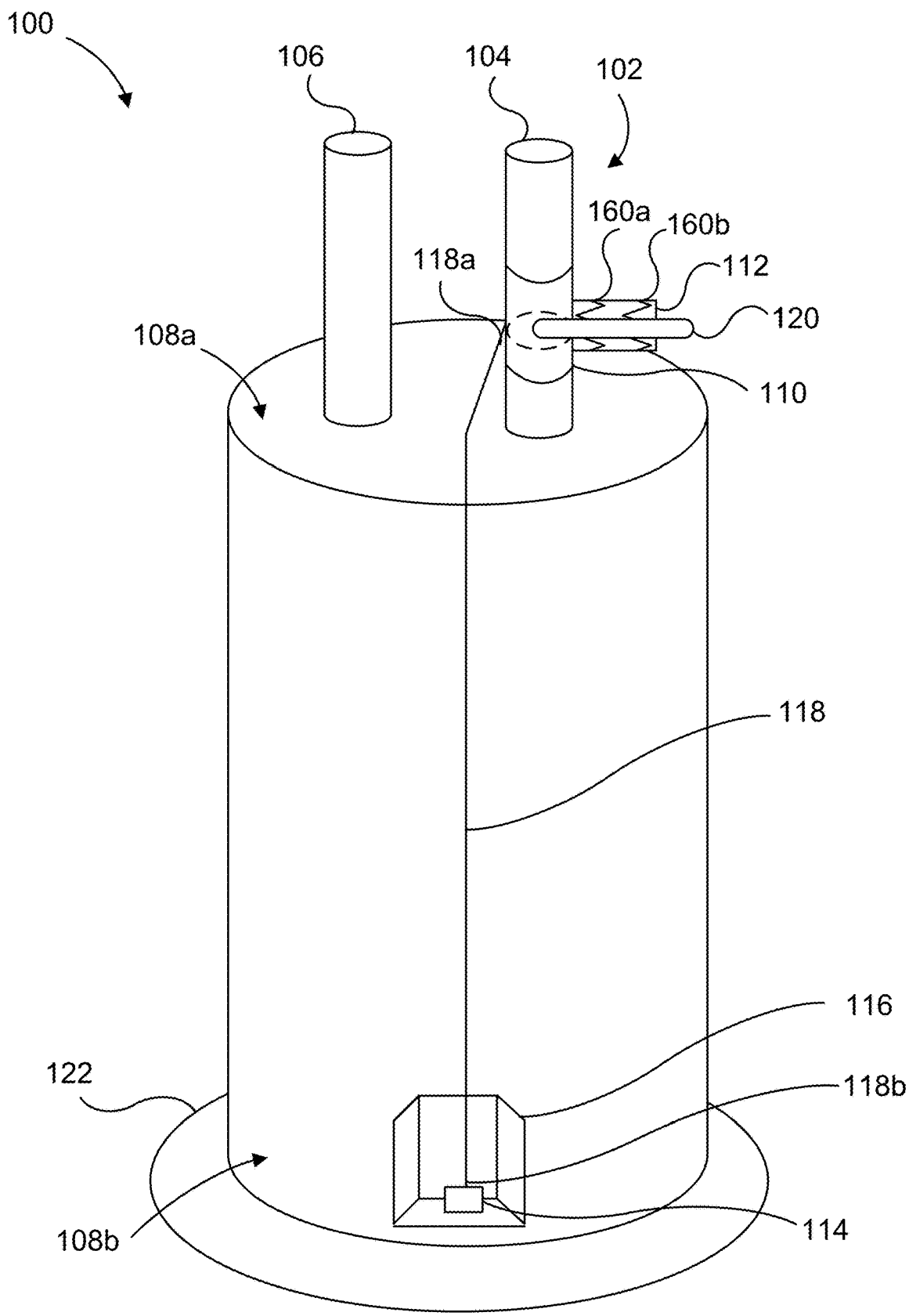
FIG. 1A is a schematic diagram of a fluid heating device in communication with an example valve assembly, in accordance with the disclosed technology.

The disclosed technology includes a non-powered valve assembly having a valve, an actuating system, and a trigger. The trigger can be in mechanical communication with the actuating system via a tensioner, and the actuating system can be in mechanical communication with the valve. Tension in the tensioner extending from the actuating system to the trigger can maintain the valve in an open position during normal operation of a fluid heating device (or any fluid system, regardless of whether the fluid is heated) such that the passage of liquid through the fluid heating device can be unobstructed. When the fluid heating device begins to leak, liquid from the leak can accumulate near the base of the fluid heating device. The trigger can be positioned within a trigger housing of the fluid heating device such that the trigger can interact with the liquid. Upon interaction with liquid, the trigger can dissolve (or partially dissolve or disintegrate), thereby releasing the tensioner, which can in turn activate the actuating system to cause the valve to transition from the open position to a closed position. In the closed position, the valve can restrict or prevent further passage of liquid through the fluid heating device such that the leak can be mitigated.

The disclosed technology also includes a valve assembly having a valve, a sensor, an electronically controlled valve, and an actuating system. In response to the sensor detecting the presence of the liquid, the electronically controlled valve can transition from a closed position to the open position. The electronically controlled valve can be in mechanical communication with the actuating system such that when the electronically controlled valve transitions to the open position, the actuating system can be activated. The actuating system can release stored energy, causing the valve to transition from the open position to a closed position. By detecting and quickly stopping a leak using the a mechanically actuated valve assembly, costly water damage can be minimized.

The disclosed technology will be described more fully hereinafter with reference to the accompanying drawings. This disclosed technology can, however, be embodied in many different forms and should not be construed as limited to the examples set forth herein. The components described hereinafter as making up various elements of the disclosed technology are intended to be illustrative and not restrictive. Such other components not described herein may include, but are not limited to, for example, components developed after development of the disclosed technology.

In the following description, numerous specific details are set forth. But it is to be understood that examples of the disclosed technology can be practiced without these specific details. In other instances, well-known methods, structures, and techniques have not been shown in detail in order not to obscure an understanding of this description. References to "one embodiment," "an embodiment," "example embodiment," "some embodiments," "certain embodiments," "various embodiments," "one example,' "an example," "some examples," "certain examples," "various examples," etc., indicate that the embodiment(s) and/or example(s) of the disclosed technology so described may include a particular feature, structure, or characteristic, but not every embodiment necessarily includes the particular feature, structure, or characteristic. Further, repeated use of the phrase "in one embodiment" or the like does not necessarily refer to the same embodiment, example, or implementation, although it may.

Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

Unless otherwise specified, the use of the ordinal adjectives "first," "second," "third," etc., to describe a common object, merely indicate that different instances of like objects are being referred to, and are not intended to imply that the objects so described should be in a given sequence, either temporally, spatially, in ranking, or in any other manner.

Unless otherwise specified, all ranges disclosed herein are inclusive of stated end points, as well as all intermediate values. By way of example, a range described as being "from approximately 2 to approximately 4" includes the values 2 and 4 and all intermediate values within the range. Likewise, the expression that a property "can be in a range from approximately 2 to approximately 4" (or "can be in a range from 2 to 4") means that the property can be approximately 2, can be approximately 4, or can be any value therebetween.

As used herein, the term "non-powered" refers to something that is not powered by electricity, motors, or the like. That is, a non-powered device or system can include one or more components configured to store energy (provided it does not include a motor and/or utilize electricity), such as stored mechanical energy. For example, a non-powered device can include a compressed spring storing potential energy (i.e., stored mechanical energy).

Referring now to the drawings, FIG. 1A is a schematic diagram of an example fluid heating device 100 including an example valve assembly 102. The fluid heating device 100 can be of any type, including tank-based or tankless and can have any heat source, either gas, electric, or a combination thereof. Although FIG. 1A illustrates a fluid heating device 100 in communication with the valve assembly 102, it is contemplated that the disclosed technology can be used in conjunction with any fluid system and is not limited to use with fluid heating devices or systems. The fluid heating device 100 can include an inlet pipe 104 for receiving a flow of water and an outlet pipe 106 for outputting a flow of water. The valve assembly 102 can be positioned at, on, or proximate the inlet pipe 104. As illustrated in FIG. 1A, the inlet pipe 104 and the outlet pipe 106 can be disposed on or near a top surface 108a of the fluid heating device 100. In this configuration, a dip tube can extend from proximate the top surface 108a to proximate a bottom surface 108b of the fluid heating device 100 such that unheated water entering the fluid heating device 100 via the inlet pipe 104 can be distributed proximate to the bottom surface 108b. Optionally, the inlet pipe 104 can be disposed proximate a bottom surface of the fluid heating device 100.

The valve assembly 102 can include a valve 110, an actuating system 112, and a trigger 114. The valve 110 can be configured to transition from an open position to a closed position. In the open position, the valve 110 can permit unobstructed or substantially unobstructed passage of water through the inlet pipe 104. In the closed position, the passage of water through the inlet pipe 104 can be at least partially restricted or blocked entirely by the valve 110. A variety of valves 110 can be used in conjunction with the valve assembly 102, including but not limited to, a linear valve (e.g., a gate valve and a plunger valve), a rotational valve (e.g., a ball valve), and the like.

The actuating system 112 can be in mechanical communication with the valve 110 and the trigger 114. The actuating system 112 can be configured to transition the valve 110 from the open position to the closed position upon becoming initiated by the trigger 114. By way of example, the actuating system 112 can include one or more energy storage devices 160 configured to store potential energy to transition the valve 110 from the open position to the closed position. As illustrated in FIG. 1A, the actuating system 112 can include a first energy storage device 160a and a second energy storage device 160b. Each energy storage device 160a, 160b can be or include a torsion spring, tension spring, compression spring, or any other device capable of storing potential energy. As will be described more fully herein, the actuating system 112 can be located proximate and/or near the valve 110 and/or the handle 120. The handle 120 can be in mechanical communication with the valve 110 such that when the handle 120 is rotated to a first position or configuration, the valve 110 is in the open position and when the handle 120 is rotated to a second position or configuration, the valve 110 is in the closed position. When the handle 120 is rotated to the first position, an energy storage device 160 (e.g., the second energy storage device 160b) can store potential energy. By way of example, the second energy storage device 160b can be configured to store potential energy by simultaneously rotating as the handle 120 is rotated to the first position. Upon actuation of the actuating system 112, the stored potential energy of the second energy storage device 160b can be released, causing the valve 110 to close. Because the valve 110 is in mechanical communication with the handle 120 (as will be described more fully herein), the transition of the valve 110 from the open position to the closed position can cause the handle 120 to move from the second configuration to the first configuration. By way of example, the valve 110 can be in the open position when the handle 120 is parallel with the inlet pipe 104 (e.g., the first position or configuration), and the valve 110 can be in the closed position when the handle 120 is perpendicular to the inlet pipe 104 (e.g., the second position or configuration). This can help provide an easily recognizable visual indication (by way of the handle's 120 current position) of the valve's 110 current position (i.e., open or closed).

The trigger 114 can include one or more liquid-soluble materials. By way of example, the trigger 114 can include polyvinyl alcohol, calcium, salt, sugar, paper, any other liquid-soluble material (or any material that can become softened by interaction of the material with a liquid, regardless of whether the material actually dissolves), or any combination thereof. The trigger 114 can be configured to at least partially dissolve, disintegrate, and/or physically change (e.g., soften) upon coming into contact with a liquid. For example, the trigger 114 can be configured to dissolve entirely upon coming into contact with a liquid. Alternatively or additionally, the trigger 114 can be configured to soften upon coming into contact with a liquid. Regardless, the trigger 114 can be configured to restrict movement of the tensioner 118 when the trigger 114 is in the dry state, and the trigger 114 can be configured to permit movement of the tensioner 118, thereby releasing energy from the tensioner 118 (e.g., to ultimately transition the valve 110 from the open position to the closed position), when the trigger 114 is in the hydrated state.

Optionally, the trigger 114 can be positioned within a trigger housing 116. The trigger housing 116 can be a recess on an exterior surface of the fluid heating device 100. Alternatively, the trigger housing 116 can be a separate component disposed on the exterior surface of the fluid heating device 100. The trigger housing 116 can be positioned proximate a base of the fluid heating device 100. The trigger housing 116 can be positioned a predetermined height above a drain pan 122 surrounding the base of the fluid heating device 100 such that a predetermined amount of liquid can accumulate before the trigger 114 can interact with the liquid. In this configuration, the potential for false actuation due to condensation can be minimized.

The trigger 114 can be in mechanical communication with the actuating system 112 via a tensioner 118. The tensioner 118 can be a rigid member or a non-rigid member (e.g., a pole, a rod, a wire, a cable, a tether, or the like) and can be configured to help maintain the actuating system 112 in a non-actuated position when the trigger 114 is in a dry state. Conversely, when the trigger 114 transitions to a hydrated state and the trigger 114 structurally fails, the tensioner 114 can become released from the trigger 114. This can release tension in the tensioner 114, which can permit the release of the energy stored by the first energy storage device 160a of the actuating system 112 which can, in turn, can release the energy stored by the second energy storage device 160b and can transition the valve 110 to the closed position.

The tensioner 118 can have a first end 118a and a second end 118b. The first end 118a can be in mechanical communication with at least a portion of the actuating system 112. The second end 118b can be in mechanical communication with the trigger 114. By way of example, the second end 118b of the tensioner 118 can be coupled to the trigger 114 via any attachment mechanism, including but not limited to a tying, hooking, twisting, and the like. Alternatively, the second end 118b of the tensioner 118 can include an eyelet or a larger diameter cap, which can be restrained by at least a portion of the trigger 114 (e.g., a portion of the trigger 114 can extent through the eyelet, a portion of the trigger can abut and restrict movement of the tensioner 114 (e.g., movement of the tensioner 114 away from the trigger 114 and toward the actuating device 112). As an example, the trigger 114 can be configured to abut a portion of the second end 118b of the tensioner 118 as well as a slot or other restraining surface of the trigger housing 116 or some other component (i.e., to restrict the tensioner 118 and provide tension in the tensioner 118). The tensioner 118 can extend from the trigger 114 to the actuating system 112. As an example, the length of the tensioner 118 can approximately equal the height of the fluid heating device 100. The tensioner 118 can be in a taut or tensioned configuration when the valve 110 is in the open position. That is, the tensioner 118 can be pulled taught and restricted at the second end 118b such that the first end 118a of the tensioner 118 can maintain the actuating system 112 in a non-actuated configuration, thereby maintaining the valve 110 in the open position. When the trigger 114 sufficiently changes in physical form (e.g., softens, disintegrates, dissolves), the trigger 114 can structurally fail, thereby releasing the tensioner 118, which in turn, permits the first and second energy storage devices 160a, 160b (e.g., torsion springs) of the actuating system 112 to release, thereby causing the valve 110 to transition from the open position to the closed position.

Optionally, the valve assembly 102 can further include a battery (e.g., a coin cell battery) has and one or more contacts. When the valve 110 closes, the contacts can be caused to create a circuit with a battery, thereby initiating an alarm and providing an audible indicator that the valve 110 is closed and a potential leak has been detected.

Because the components of the valve assembly 102 are in mechanical communication with one another and because energy for transitioning the valve 110 from the open position to the closed position can be provided by mechanical energy from the actuating system 112, electrical communication and/or power is not needed. Accordingly, the valve assembly 102 can effectively and efficiently operate to mitigate and stop a leak even during instances in which power is not available (e.g., failed electronics, a temporary power outage occurs).

Figure 1B:
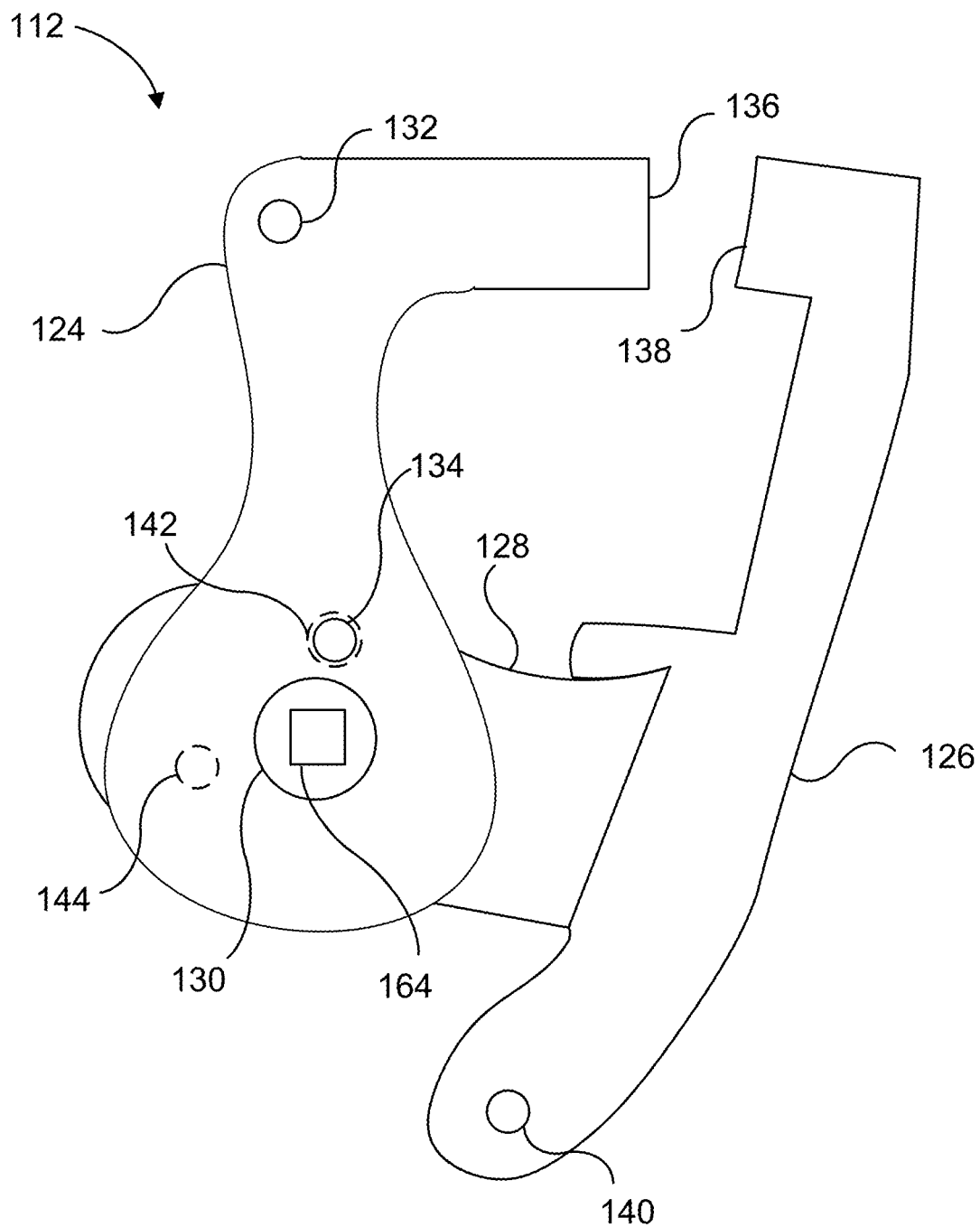
FIG. 1B is a schematic diagram of an example actuating system of the valve assembly illustrated in FIG. 1A, in accordance with the disclosed technology.

FIG. 1B is a schematic diagram of the actuating system 112 of the valve assembly 102. The actuating system 112 can include a hammer 124, a latching pawl 126, and an actuator 128. The hammer 124, the latching pawl 126, and the valve actuator 128 can be in mechanical communication with one another such that when the trigger 114 transitions to the hydrated state and releases stored energy from the energy storage devices 160a, 160b, the hammer 124, latching pawl 126, and valve actuator 128 can transition the valve 110 from the open position to the closed position, as described more fully herein.

The hammer 124 can have a main body including an aperture 130 sized to receive a stem 150 of the valve 110 and a striking end 136 extending from the main body. The striking end 136 can have a greater thickness than the main body. The striking end 136 can contact the latching pawl 126 upon the actuating system 112 being activated with sufficient force to mechanically disengage the latching pawl 126 from the actuator 128. The hammer 124 can further include a first aperture 132 configured to receive the first end 118a of the tensioner 118. By way of example, the first end 118a of the tensioner 118 can be affixed to the aperture 132 via any attachment means, including but not limited to tying, hooking, twisting, and the like. When the second end 118b of the tensioner 118 is affixed to the trigger 114, the tensioner 118 can be pulled taught, creating tension between the trigger 114 and the actuating system 112. When the tensioner 118 is pulled taught, the hammer 124 can be pulled away from the latching pawl 126. The hammer 124 can further have a second aperture 134 configured to receive the first energy storage device 160a (e.g., a torsion spring, tension spring, compression spring, and the like). When the hammer 124 is pulled away from the latching pawl 126, the first energy storage device 160a can rotate, thereby storing energy that can be released upon activation of the actuating system 112.

When the actuating system 112 is not activated, the latching pawl 126 can be manually engaged with the actuator 128 and can maintain the valve 110 in the open position. The latching pawl 126 can have an anvil 138 that extends from the main body of the latching pawl 126. The anvil 138 can have a greater thickness than the main body. The latching pawl 126 can include a pivot point 140. The pivot point 140 can be located at or near an aperture disposed on the main body of the latching pawl 126 opposite of the anvil 138. Upon activation of the actuating system 112, the latching pawl 126 can rotate with respect to the pivot point 140 and disengage from the actuator 128. The pivot point 140 can be in operative communication with the valve 110. The pivot point 140 can also be the attachment point for the second energy storage device 160b.

When the actuating system 112 is not activated, the actuator 128 can be in mechanical communication with the hammer 124 and the latching pawl 126. Upon the actuating system 112 being activated, the hammer 124 can rotate such that the striking end 136 can strike the anvil 138 of the latching pawl 126 causing the latching pawl 126 to disengage from and/or release the actuator 128. The actuator 128 can have an aperture 164 sized to receive the stem 150 of the valve 110. The size and/or cross-section shape of the aperture 164 can correspond to the size and/or cross-section shape of the stem 150 of the valve. By way of example, the aperture 164 can have a substantially square cross-section. The valve actuator 128 can have a first aperture 142 that aligns with the aperture 134 of the hammer 124 and that is configured to receive the first energy storage device 160a (e.g., a first torsion spring). When the tensioner 118 is coupled to the trigger 114, the hammer 124 can be pulled away from the latching pawl 126 and the first energy storage device 160a can store potential energy (e.g., by rotating, stretching, compressing, etc.). The valve actuator 128 can have a second aperture 144 that is configured to receive the second energy storage device 160b (e.g., a second torsion spring) such that the valve actuator 128 is in mechanical communication with the hammer 124 and the latching pawl 126. The actuator 128 can rotate upon activation of the actuating system 112 and release of stored potential energy from the first energy storage device 160a, thereby causing the second storage device 160b to release stored energy and the valve 110 to transition to the closed position. By way of example, when the actuator 128 rotates upon activation of the actuating system 112, the stem of the valve 110 can corresponding rotating, thereby closing the valve 110.

Figure 1C:
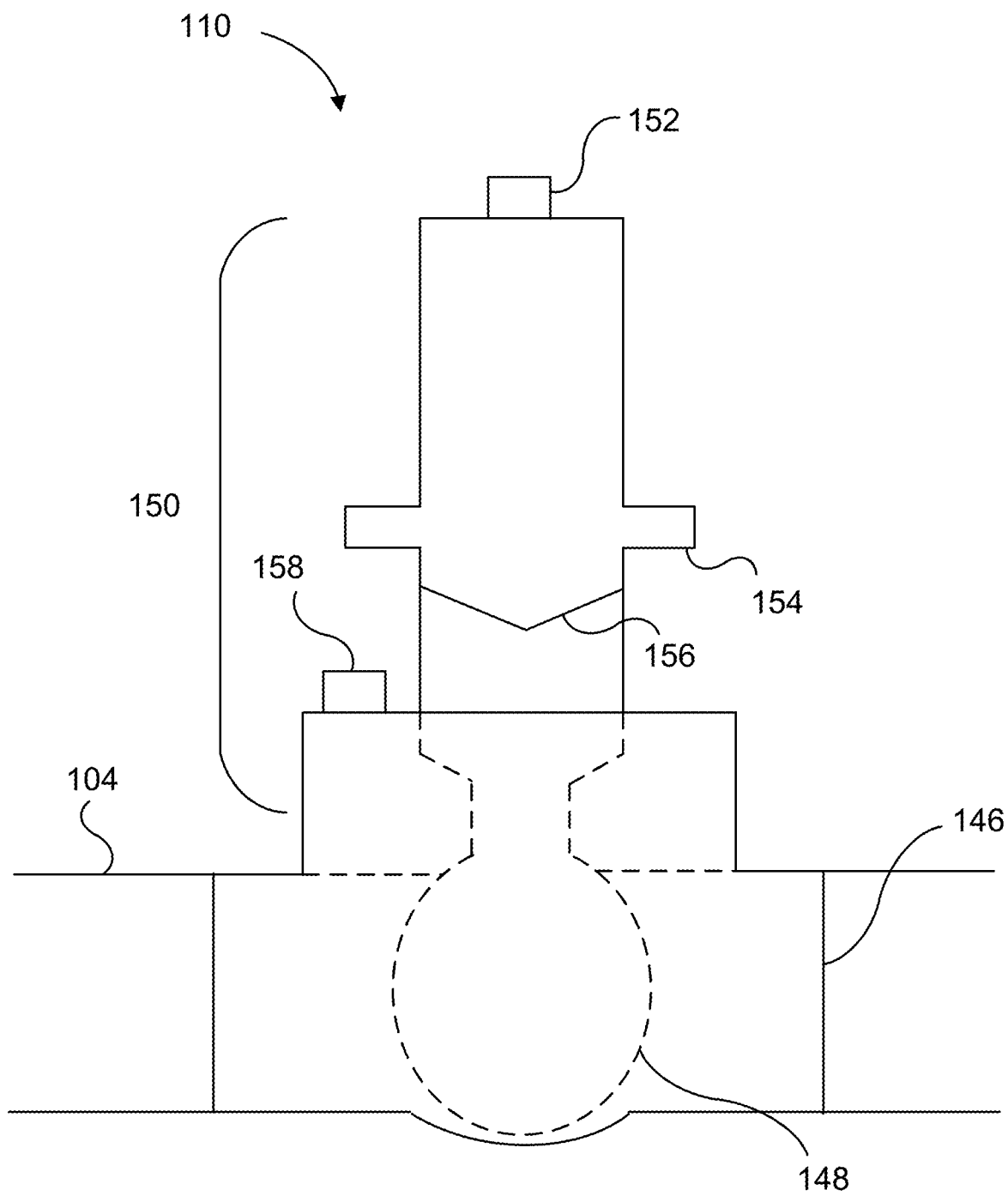
FIG. 1C is a schematic diagram of an example valve of the valve assembly illustrated in FIG. 1A, in accordance with the disclosed technology.

FIG. 1C is a schematic diagram of the valve 110 of the valve assembly 102. The valve 110 can have a body 146, a flow barrier 148, and a stem 150. The body 146 can be an outer casing that surrounds the inlet pipe 104. The body 146 can be made of durable material, including but not limited to, cooper, stainless steel, aluminum, nickel, and combinations thereof. The body 146 can include an attachment point 158 for the second energy storage device 160b. The attachment point 158 can be a hollow, cylindrical protrusion sized to receive the second energy storage device 160b. The attachment point 158 can also function as the pivot point 140 for the latching pawl 126.

When the valve 110 is in the open position, the flow barrier 148 can be in a stowed position permitting much or all of the inlet's 104 flow passage to stay open. When the valve 110 is in the closed position, the flow barrier 148 can be configured to block or restrict the passage of water through the inlet pipe 104. The flow barrier 148 can have any shape. Depending on the type of valve 110, the flow barrier 148 can move linearly or can rotate. By way of example, when the valve 110 is a ball valve, the flow barrier 148 can have a substantially spherical shape. In this configuration, the flow barrier 148 can have a cylindrical cavity that can align with the inlet pipe 104 to permit water to pass through and into the fluid heating device 100. Upon the flow barrier 148 being rotated, the cavity is no longer aligned with the inlet pipe 104, and the passage of water becomes blocked by the flow barrier 148.

The stem 150 can extend from the flow barrier 148. The stem 150 can be configured to linearly move upon actuation of the actuating system 112. Alternatively, the stem 150 can be configured to rotate upon actuation of the actuating system 112. The stem 150 can include an attachment point 152 for the handle 120. The attachment point 152 can be substantially cuboid or any other shape such that rotation of the handle 120 can impart rotation to the valve stem 150 at the attachment point 152. The handle 120 can be rotated to open and close the valve 110. By way of example, the handle 120 can be rotated such that the handle 120 is parallel to the inlet pipe 104 and the valve 110 is in the open position. Alternatively, the handle 120 can be rotated such that the handle 120 is perpendicular to the inlet pipe 104 and the valve 110 is in the closed position. The stem 150 can include a platform 154. At least a portion of the actuating system 112 can rest on the platform 154. By way of example, the hammer 124 can be positioned on or proximate the platform 154. The stem 150 can further include an attachment point 156 for the actuator 128. The attachment point 156 can be below the platform 154. The stem 150 can include a substantially rectangular bottom portion (e.g., below the platform 154) such that the bottom portion of the stem 150 can be inserted into the aperture 164 of the actuator 128. As will be appreciated, the stem 150 can have any other shape such that rotation of the actuator 128 can impart rotation to the valve stem 150 at the attachment point 156. The stem 150 can include a substantially cylindrical upper portion (e.g., above the platform 154) such that the upper portion of the stem 150 can be inserted into the aperture 130 of the hammer 124.

Figure 1D:
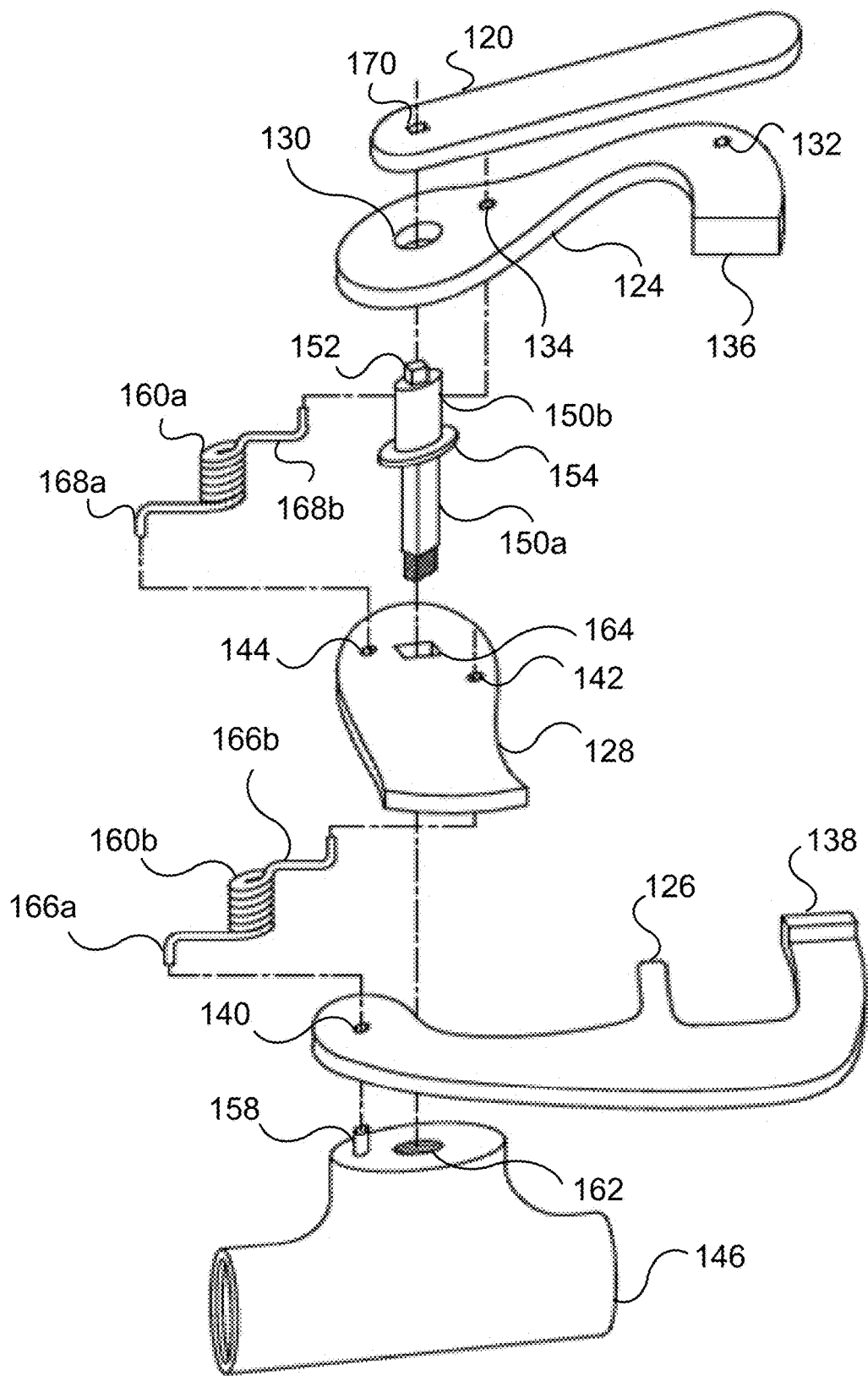
FIG. 1D is an exploded view of the example actuating system of FIG. 1B and the example valve of FIG. 1C, in accordance with the disclosed technology.

FIG. 1D illustrates an exploded view of the example actuating system 112 as illustrated in FIG. 1B and the example valve 110 as illustrated in FIG. 1C. As illustrated in FIG. 1D, the valve body 146 can have a central insertion point 162. The valve body 146 can include the attachment point 158, which can be a hollow protrusion. The attachment point 158 can be inserted into the aperture 140 of the latching pawl 126. In this configuration, the latching pawl 126 can pivot (e.g., rotate) about the attachment point 158. A first arm 166a of the second energy storage device 160b can be inserted through the aperture 140 of the latching pawl and into the attachment point 158. A second arm 166b of the second energy storage device 160b can extend upward such that the second arm 166b can be inserted through the first aperture 142 of the actuator 128. The lower portion 150a of the valve stem 150 can be inserted through the central aperture 164 of the actuator 128 and into the central insertion point 162. The lower portion 150a can be cuboid and the central aperture 164 of the actuator 128 can be square, or the lower portion 150a can have any other cross-sectional shape corresponding to the shape of the central aperture 164 such that rotation of the actuator 128 can rotate the valve stem 150. The size of the aperture 164 can be sized to substantially correspond to the cross-sectional area of the substantially lower portion 150a of the valve stem 150, such that the actuator 128 can rotate the valve stem 150 upon release of stored energy from the second energy storage device 160b. The hammer 124 can include a circular aperture 130 that can receive a substantially cylindrical upper portion 150b of the valve stem 150. The hammer 124 can rest on the platform 154 when the substantially cylindrical portion 150b of the valve stem 150 is inserted into the circular aperture 130. In this configuration, the hammer 124 can freely rotate with respect to the valve stem 150. A first arm 168a of the first energy storage device 160a can extend downward such that the first arm 168a can be inserted into the second aperture 144 of the actuator 128. A second arm 168b of the first energy storage device 160a can extend upward such that the second arm 168b can be inserted into second aperture 134 of the hammer 124. The first aperture 132 of the hammer 124 can serve as the connection point for the tensioner 118. The handle 120 can be positioned in mechanical communication with the valve stem 150. For example, a square aperture 170 of the handle 120 can be sized to receive the square attachment point 152 of the valve stem 150 (although alternative shapes are contemplated). In this configuration, when the handle 120 is rotated, the valve stem 150 can correspondingly rotate, thereby opening and/or closing the flow barrier 148 disposed within the valve body 146.

Figure 2:
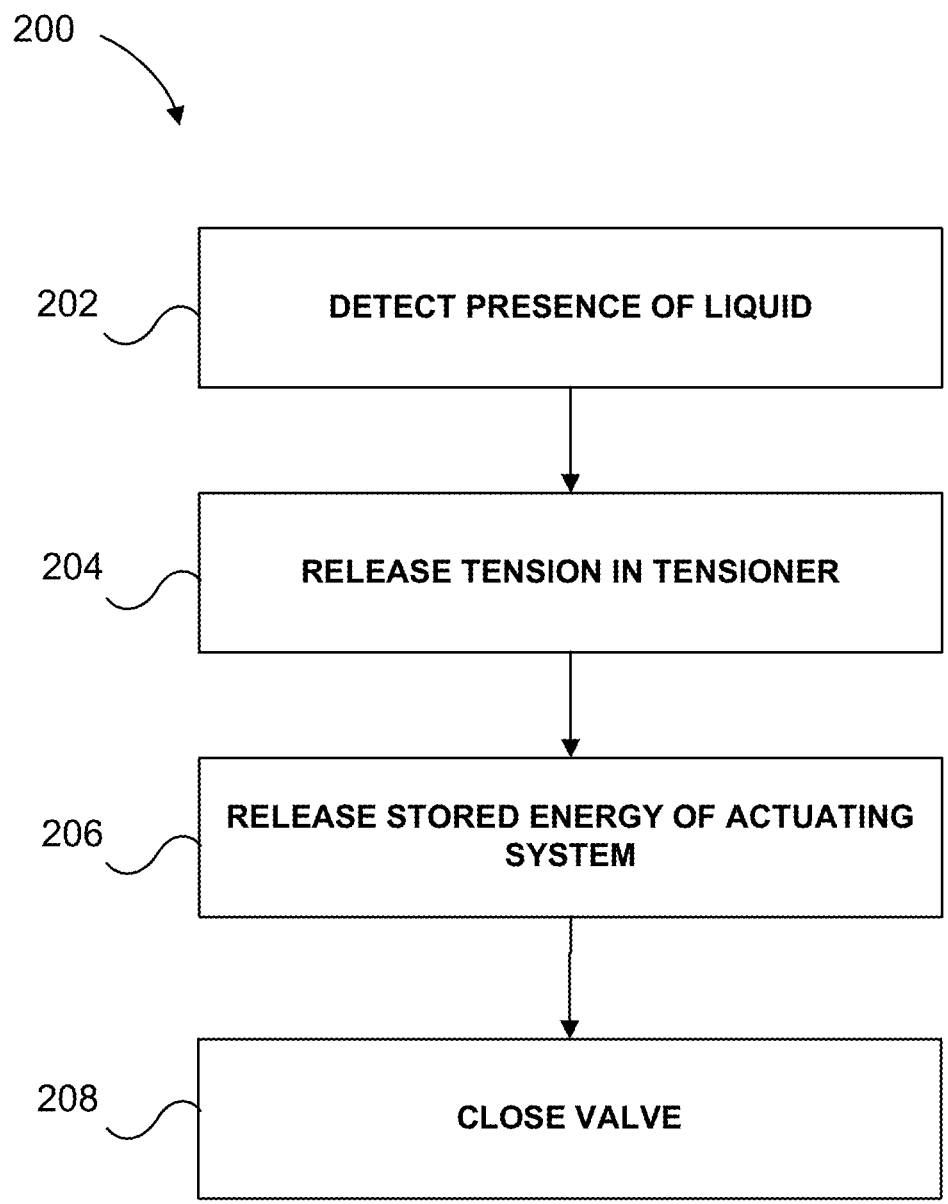
FIG. 2 is a flow chart outlining an example method of detecting and mitigating a leak using the valve assembly of FIGS. 1A through 1C, in accordance with the disclosed technology.

FIG. 2 illustrates a flow diagram outlining a method 200 of detecting and mitigating a liquid leak using the example valve assembly 102 illustrated in FIGS. 1A through 1C. When a leak occurs in a fluid heating device 100, liquid can collect proximate the base of the fluid heating device 100. When a sufficient amount of liquid accumulates, the presence of liquid can be detected 202. As discussed herein, the trigger 114 can transition from a dry state to a hydrated state upon the presence of liquid. When the trigger 114 and the liquid interact and the trigger 114 transitions to the hydrated state, the trigger 114 can sufficiently change in physical form (e.g., softens, disintegrates, dissolves), such that the trigger 114 can structurally fails. When the trigger 114 transitions to the hydrated state, the tension within the tensioner 118 can be released 204. When the tension is released, the actuating system 112 can be activated by way of releasing 206 the stored energy of the actuating system 112. The stored energy of the actuating system 112 can transition 208 the valve 110 from the open position to the closed position.

Once the valve assembly 102 detects and mitigates a liquid leak, the valve assembly 102 can be reset such that the valve assembly 102 can detect and mitigate subsequent leaks. The valve assembly 102 can be reset by positioning a second trigger within the trigger housing 116 of the fluid heating device 100 while the valve 110 remains in the closed position and accordingly, there is no tension in the tensioner 118. The handle 120 can be manually rotated back to the orientation in which the valve 110 is in the open position. By way of example, the handle 120 can be rotated from the perpendicular orientation with respect to the inlet pipe 104 back to the parallel orientation with respect to the inlet pipe 104. By rotating the handle 120, the second energy storage device 160b in communication with the valve 110 can store energy capable of being released upon activating the actuating system 112. The second end 118b of the tensioner 118 can be recoupled to the second trigger. When the second end 118b of the tensioner 118 is recoupled to the second trigger, the hammer 124 can be pulled back away from the latching pawl 126 and the first energy storage device 160a can store energy capable of being released upon activating the actuating system 112. The tensioner 118 can be pulled taught to create tension between the second trigger and the hammer 124 of the actuating system 112. The latching pawl 126 can be manually engaged with the valve actuator 128 such that the valve 110 is held in the open position. Upon the second trigger 114 interacting with liquid, the actuating system 112 can be actuated and the valve 110 can close as described herein.

Figure 3A:
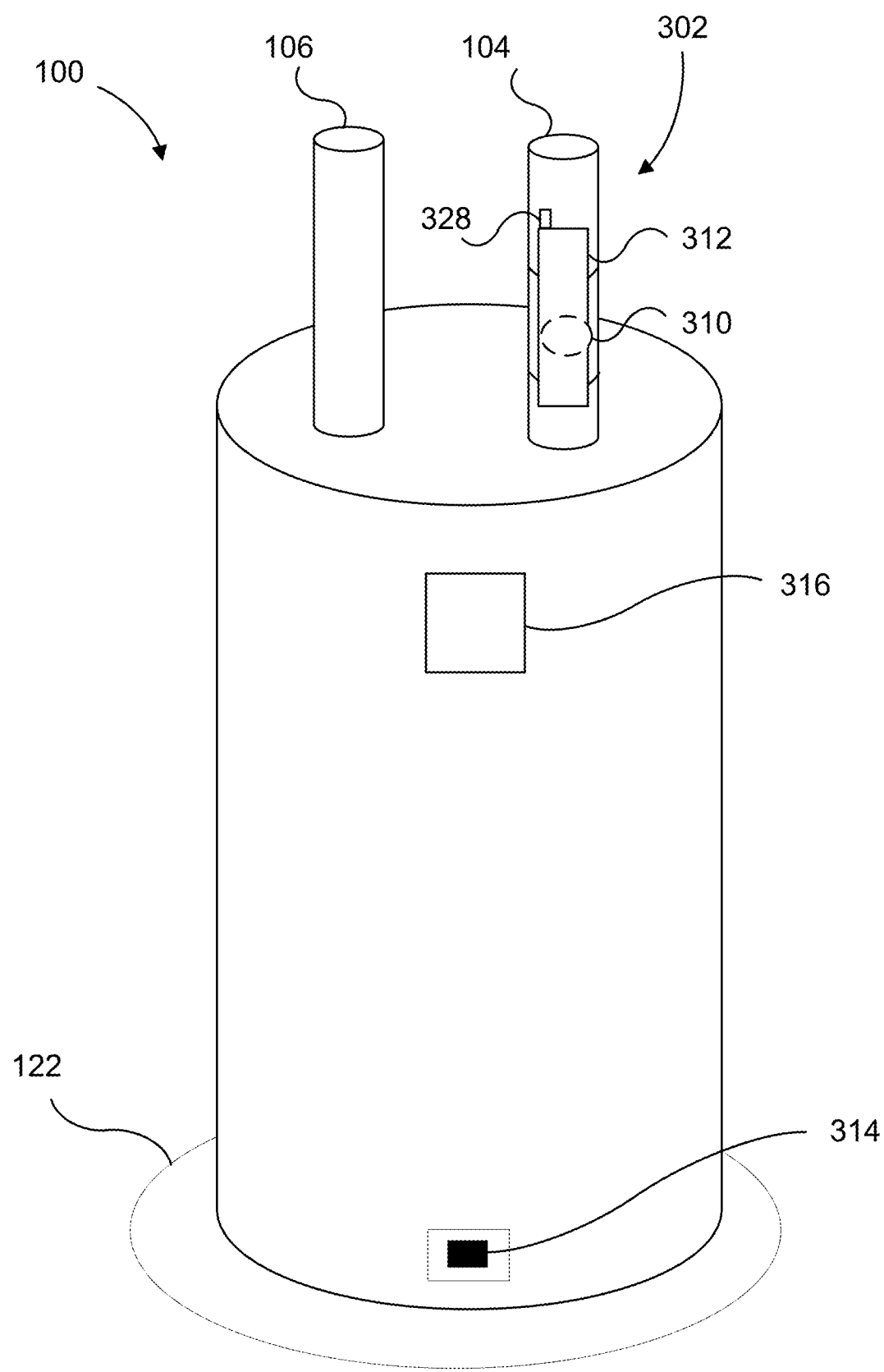
FIG. 3A is a schematic diagram of a fluid heating device in communication with an additional example valve assembly, in accordance with the disclosed technology.

FIG. 3A illustrates a fluid heating device 100 having an example valve assembly 302. The fluid heating device 100 can have an inlet pipe 104 for receiving a flow of water and an outlet pipe 106 for outputting the flow of water. The valve assembly 302 can include a valve 310, an actuating system 312, one or more sensors 314, and an electronically controlled plunger 328.

The valve 310 can be configured to transition from an open position to a closed position. In the open position, a flow of water can be permitted to pass through the inlet pipe 304. In the closed position, the flow of water can be prohibited from passing through the inlet pipe 304. A variety of valves 310 can be used in conjunction with the valve assembly 302, including but not limited to, rotational valves (e.g., ball valves), linear valves (e.g., gate valves and plunger valves), and the like.

The actuating system 312 can be positioned on, near, or proximate the inlet pipe 304. The actuating system 312 can be in mechanical communication with the valve 310 and the electronically controlled plunger 328. The actuating system 312 can store energy used to transition the valve 310 from the open position to the closed position upon the sensor 314 detecting a presence of liquid.

The one or more sensors 314 can be positioned proximate the base of the fluid heating device 100. The sensor 314 can be positioned a predetermined height above a drain pan 122 surrounding the base of the fluid heating device 100 such that a sufficient amount of liquid can accumulate prior to the sensor 314 detecting the presence of liquid and thereby actuating the actuating system 312. In this configuration, the potential for false actuation due to condensation can be minimized.

The electronically controlled plunger 328 can be in mechanical communication with the actuating system 312 and can be in electrical communication with the sensor 314. The electronically controlled plunger 328 can be in a closed position when the valve 310 is open. In the closed position, the electronically controlled plunger 328, which is in mechanical communication with the actuating system 312, can maintain the actuating system 312 in a non-activated configuration. Upon the sensor 314 detecting the presence of liquid, the electronically controlled plunger 328 can transition from the closed position to the open position. In the open position, the electronically controlled plunger 328 can release or otherwise terminate mechanical communication with the actuating system 312, thereby activating the actuating system 312.

The fluid heating device 100 can further include a controller 316. The controller 316 can be configured to receive one or more signals from various components of the fluid heating device 100 and output one more signals to various components of the fluid heating device 100. In particular, the controller 316 can be in electrical communication with the sensor 314 and the electronically controlled plunger 328.

The controller 316 can receive a signal from the sensor 314 upon the sensor 314 detecting the presence of liquid. In response, the controller 316 can output a signal to the electronically controlled plunger 328 to transition from the closed position to the open position. Optionally, in response to the sensor 314 detecting the presence of liquid, the controller 316 can output a signal to a sound device capable of producing an audible alarm (e.g., a speaker) indicating the detection of the liquid. The controller 316 can be retrofitted to the fluid heating device 300. Alternatively, the controller 316 can be independent from the fluid heating device 300.

Figure 3B:
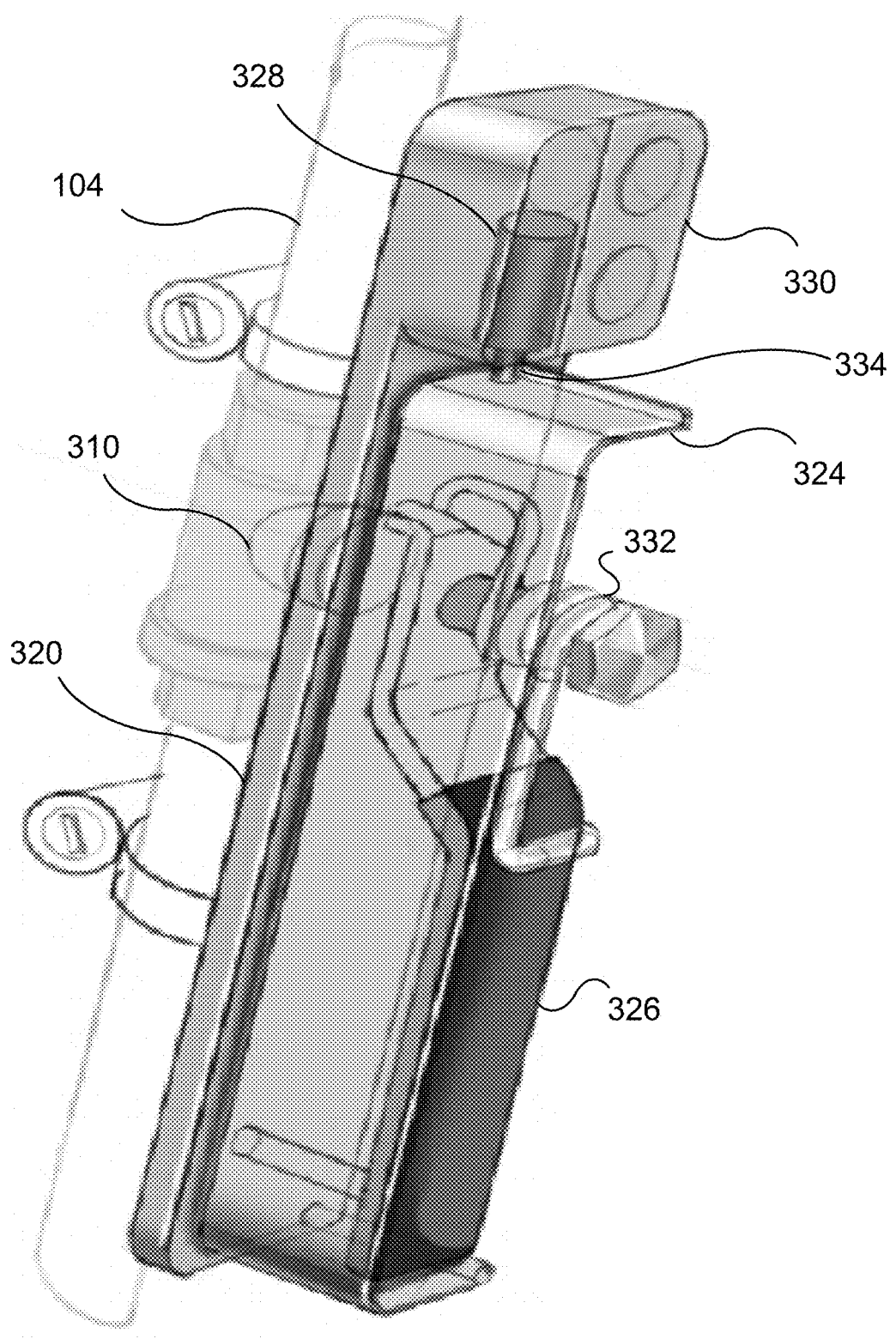
FIG. 3B illustrates an example actuating system of the valve assembly illustrated in FIG. 3A, in accordance with the disclosed technology.

FIG. 3B illustrates the actuating system 312 of the valve assembly 302. The actuating system 312 can include a lever 326, a retention latch 324, and an energy storage device 332. The components of the actuating system 312 can be at least partially disposed within an actuator housing 320. When the actuating system 312 is not actuated and the valve 310 is in the open position, the components of the actuating system 312 can be entirely disposed within the actuator housing 320.

The lever 326 can be rotated to open and close the valve 310. By way of example, the lever 326 can be configured to rotate from a parallel orientation with respect to the inlet pipe 304 to a perpendicular orientation with respect to the inlet pipe 104. When the lever 326 is parallel to the inlet pipe 104, the valve 310 is in the open position and water can pass through the inlet pipe 104 to the fluid heating device 300. When the lever 326 is perpendicular to the inlet pipe 104, the valve 310 is in the closed position and water can be restricted and/or blocked from passing through the inlet pipe 304 to the fluid heating device 300. The retention latch 324 can be positioned proximate the lever 326. The retention latch 324 can at least partially encase the lever 326 such that the lever 326 is secured within the actuator housing 320 when the valve 310 is in the open position.

The energy storage device 332 can be in mechanical communication with the lever 326. As illustrated in FIGS. 3A through 3E, the energy storage device 332 can be a torsion spring. Alternatively, the energy storage device 332 can be a tension spring, a compression spring, or any device capable of storing potential energy. When the lever 326 is rotated to maintain the valve in the open position (e.g., the lever 326 is rotated to be parallel with the inlet pipe 104), the energy storage device 332 can similarly be rotated. In this configuration, the energy storage device 332 can store potential energy.

The electronically controlled plunger 328 can be in mechanical communication with the retention latch 324 and can be in electrical communication with the controller 316. The electronically controlled plunger 328 can transition from a closed position to an open position upon receiving a signal from the controller 316 indicating a presence of a liquid. In the closed position, a plunger 334 of the electronically controlled plunger 328 can be in contact with the retention latch 324. The plunger 334 can maintain the retention latch 324 within the actuator housing 320 when the actuating system 312 is not actuated, and the valve 310 is in the open position. The electronically controlled plunger 328 can be powered by a battery 330. By powering the electronically controlled plunger 328 via the battery 330, the electronically controlled plunger 328 can operate when power is unavailable and/or undesired. Thereby, the actuating system 312 can be actuated without power and the valve 310 can accordingly be mechanically close.

Figure 3C:
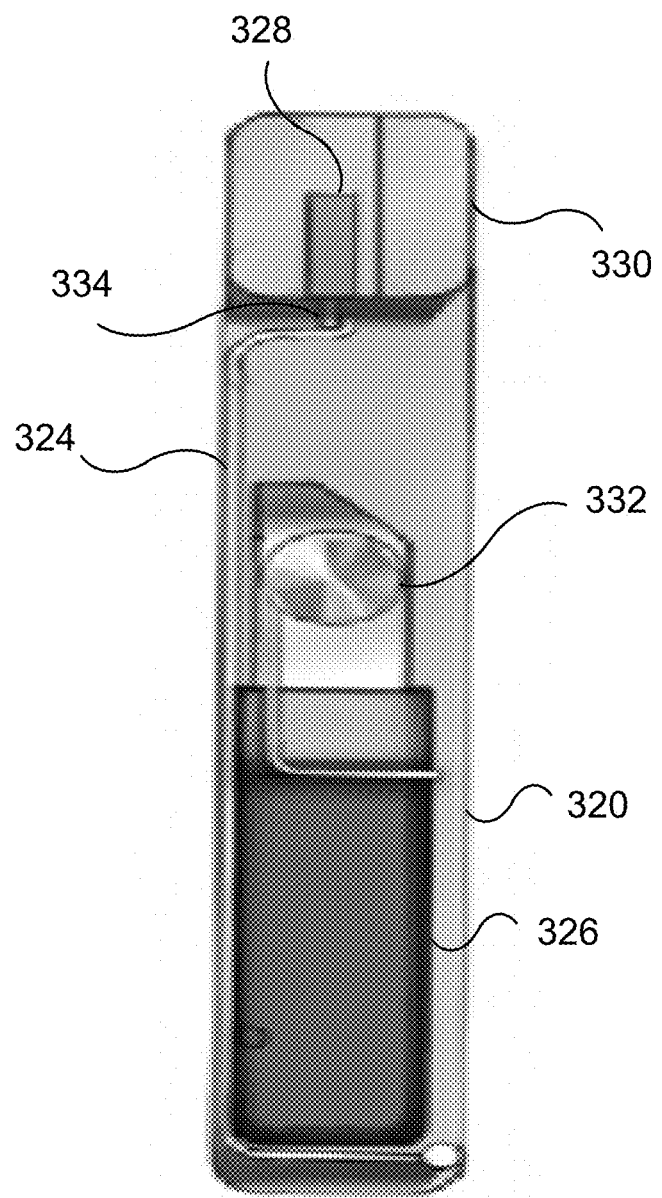
FIGS. 3C-3E are a series of illustrations depicting actuation of the example actuating system of the FIG. 3B, in accordance with the disclosed technology.
Figure 3D:
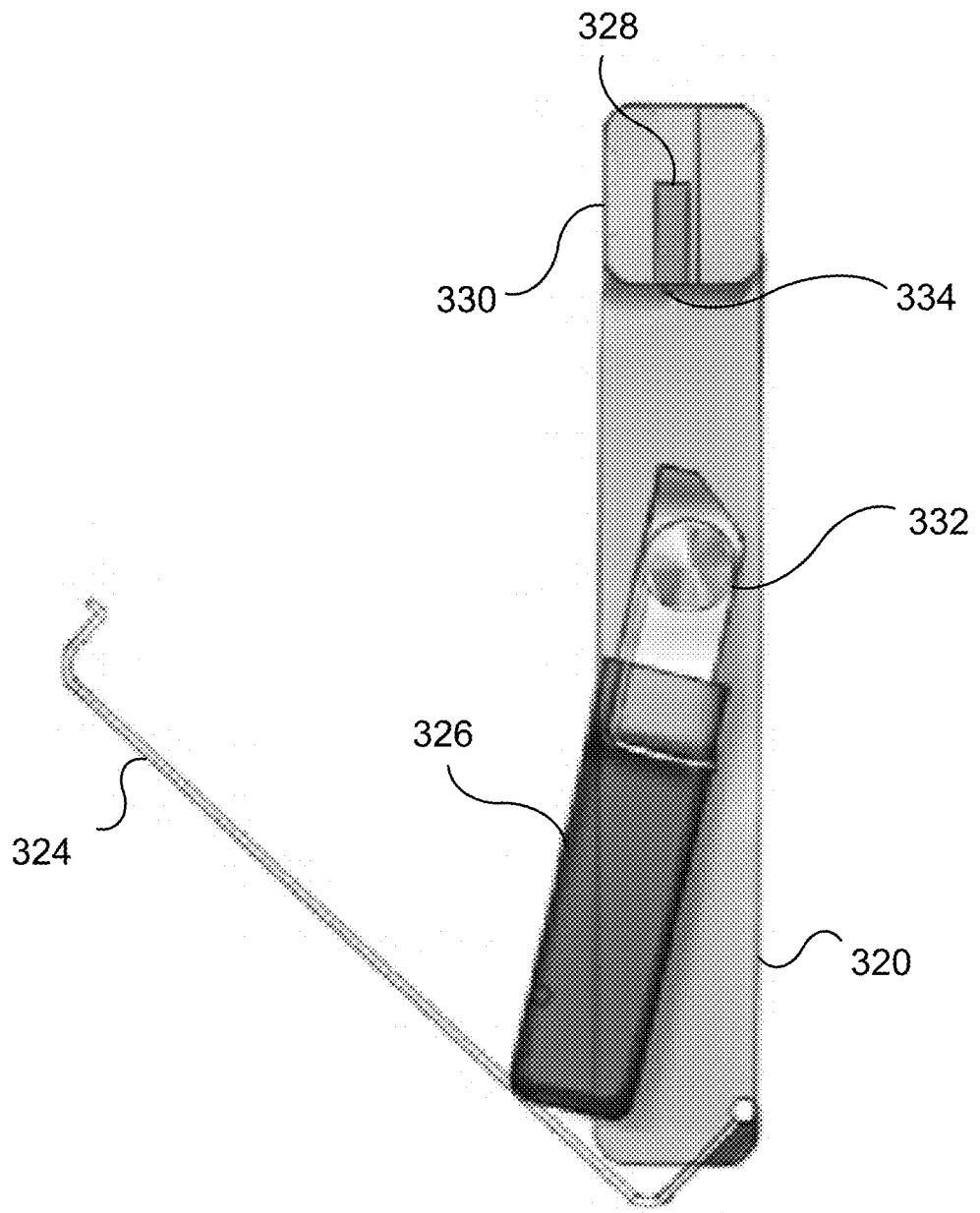
Figure 3E:
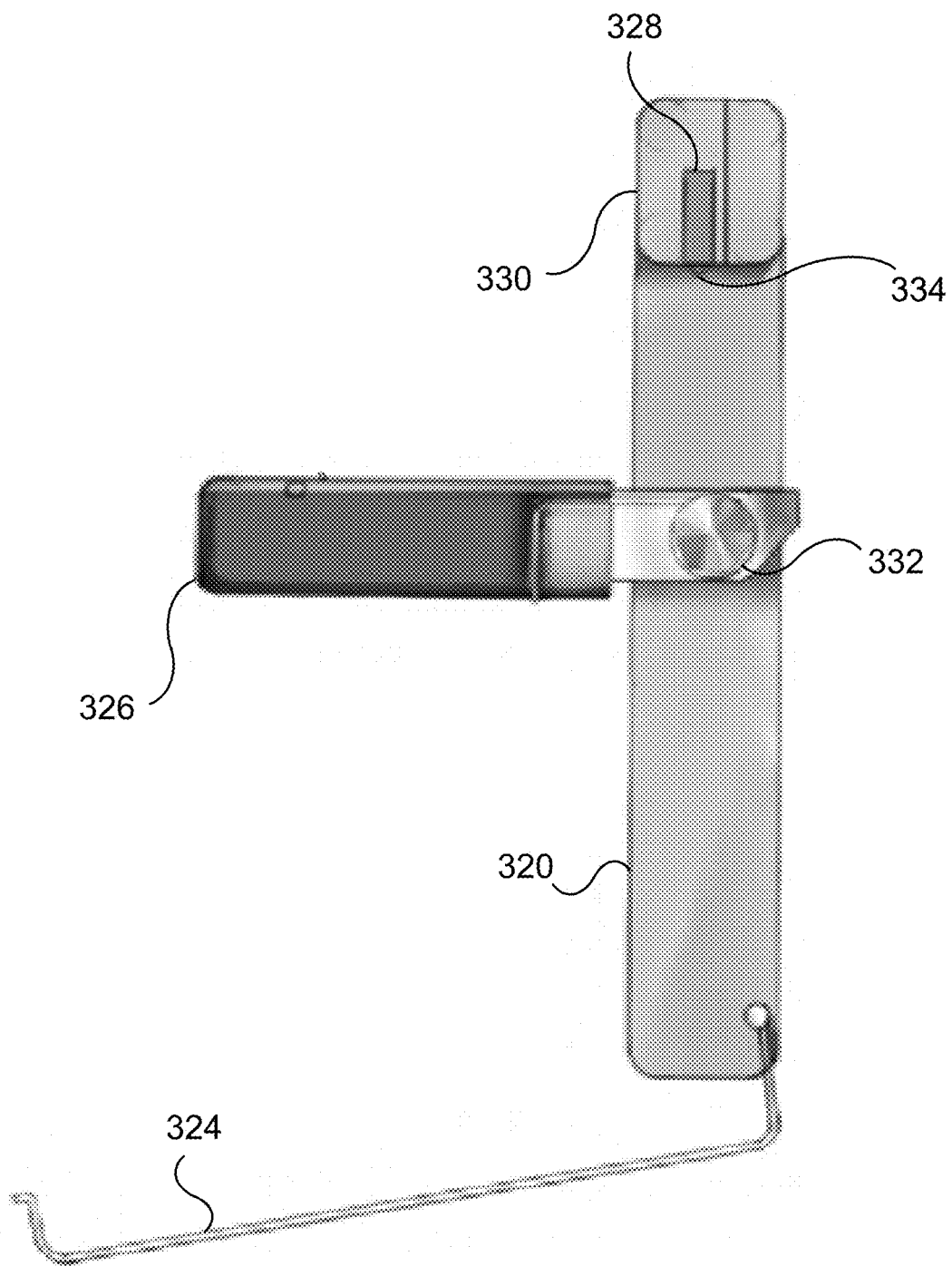

FIGS. 3C through 3E illustrate actuation of the actuating system 312. In FIG. 3C, the actuating system 312 is not activated, and the valve 310 can be in the open position. The retention latch 324 can be secured within the actuator housing 320 via the plunger 334 of the electronically controlled plunger 328. The retention latch 324 can secure the lever 326 in a parallel orientation with respect to the inlet pipe 304. In this configuration, the energy storage device 332 can be rotated to store energy.

In FIG. 3D, in response to the electronically controlled plunger 328 receiving a signal from the controller 316 indicating the presence of liquid, the electronically controlled plunger 328 can transition from the closed position where the plunger 334 maintains the retention latch 324 in place to an open position. When the plunger 334 is retracted, the retention latch 324 can be released. Because the retention latch 324 prevents the lever 326 from rotating, when the retention latch 324 is released, the stored potential energy of the energy storage device 332 can be released and the lever 326 can begin to rotate. As illustrated in FIG. 3D, the lever 326 can begin to rotate from the parallel orientation with respect to the inlet pipe 104.

In FIG. 3E, upon release, the retention latch 324 can be entirely disengaged from the actuator housing 320. The release of stored energy in the energy storage device 332 upon release of the retention latch 324 can cause the lever 326 to rotate to the perpendicular orientation with respect to the inlet pipe 104, thereby closing the valve 310. In the closed position, the valve 310 can prevent the passage of water through in inlet pipe 104, resulting in a quick and effective mitigation of leak.

Optionally, the actuator housing 320 can include contacts for supplying power to the fluid heating device 300. The contacts can be positioned such that power can be supplied to the fluid heating device 300 when the actuating system 312 is not activated and the valve 310 is open. However, upon detection of liquid and subsequent actuation of the actuating system 312 and closure of the valve 310, the contacts can become free, thereby causing the power to the fluid heating device 300 to be restrict and/or disabled. Preventing power from being supplied when a leak has been detected can promote safety and minimize the potential for electric shock during maintenance of the leak.

Figure 4:
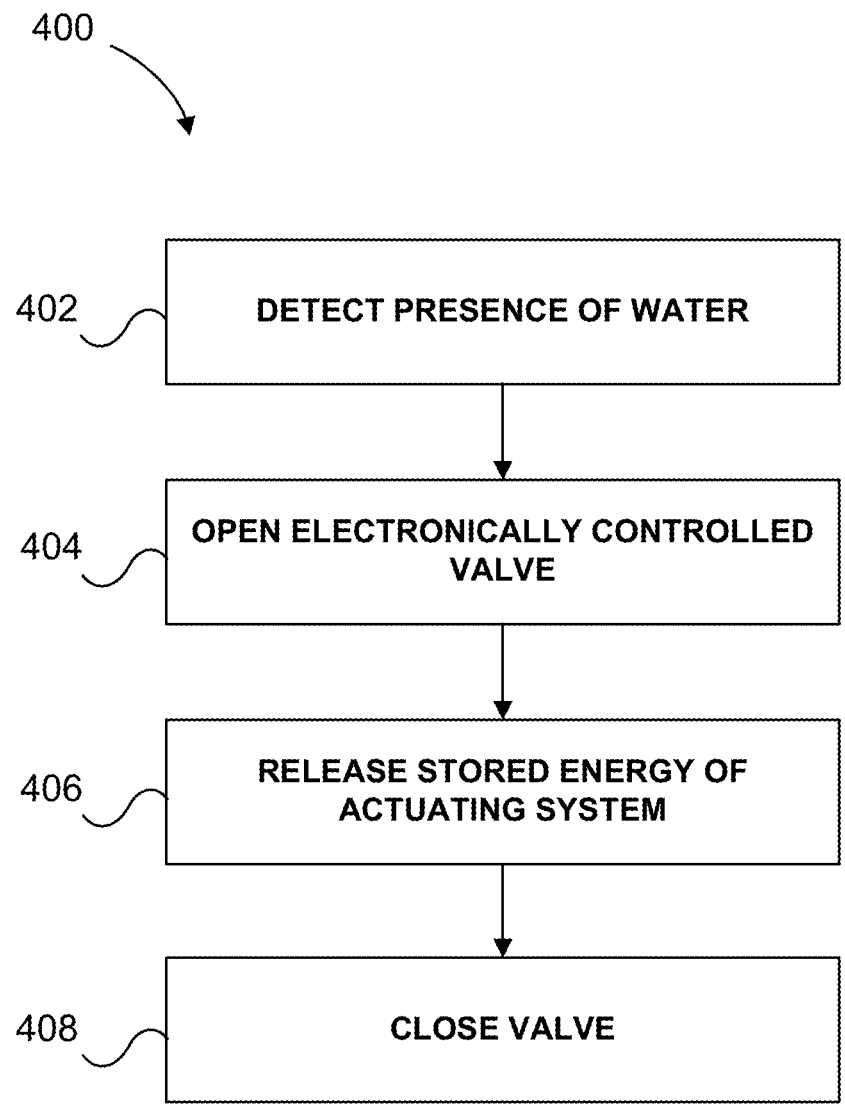
FIG. 4 is a flow chart outlining an example method of detecting and mitigating a leak using the example valve assembly of FIGS. 3A through 3E, in accordance with the disclosed technology.

FIG. 4 illustrates a flow diagram outlining a method 400 of detecting and mitigating a liquid leak using the example valve assembly 302 illustrated in FIGS. 3A through 3E. When the fluid heating device 100 begins to leak, liquid can accumulate within the drain pan 122 proximate the base of the fluid heating device 100. When a sufficient amount ofliquid accumulates, the valve assembly 302 can detect 402 a presence of a liquid. As discussed herein, the valve assembly 302 can include one or more sensors 314 configured to detect the presence of the liquid. The sensor 314 can output a signal to the controller 316 indicating the presence of the liquid. In response, the controller 316 can send a signal to the electronically controlled plunger 328 to open 404. Upon the electronically controlled plunger 328 opening, stored energy of the actuating system 312 can be released 406. The released energy of the actuating system 312 can close 408 the valve 310.

Upon the valve 310 closing, the valve assembly 302 can be reset such that the valve assembly 302 can detect and mitigate subsequent liquid leaks. Once the sensor 314 is at least partially dried, a button can be pressed to close the electronically controlled plunger 328 such that the retention latch 324 can be rotated back to the parallel orientation and can maintain the valve 310 is in the open position. Additionally, the button can be pressed to silence and/or reset the sound device that can produce an audible alarm upon the detection of liquid. Optionally, the button can be pressed to override the audible alarm for a predetermined amount of time if the liquid leak cannot be dried immediately and/or if the user determines the liquid leak does not need to be dried immediately (e.g., the liquid leak is not a harmful) The lever 326 can be mechanically rotated back to the parallel orientation and the retention latch 324 can be repositioned to secure the lever 326 within the actuator housing 320. When the lever 326 is rotated back to the parallel orientation, the valve 310 can transition from the closed position to the open position. In this configuration, the energy storage device 332 can store energy that can be used upon subsequent activation of the actuating system 312 to transition the valve 310 from the open position to the closed position.

Certain examples and implementations of the disclosed technology are described above with reference to block and flow diagrams according to examples of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams do not necessarily need to be performed in the order presented, can be repeated, or do not necessarily need to be performed at all, according to some examples or implementations of the disclosed technology. It is also to be understood that the mention of one or more method steps does not preclude the presence of additional method steps or intervening method steps between those steps expressly identified. Additionally, method steps from one process flow diagram or block diagram can be combined with method steps from another process diagram or block diagram. These combinations and/or modifications are contemplated herein.

What is claimed is:

1. A valve assembly for detecting and mitigating a liquid leak comprising:
    a valve having an open position and a closed position, the valve being configured to permit passage of liquid through a plumbing system when the valve is in the open position and restrict passage of the liquid through the plumbing system when the valve is in the closed position;
    a sensor configured to detect a presence of the liquid proximate a base of a liquid storage device fluidly connected to the plumbing system;
    an electronically controlled plunger being in electrical communication with the sensor, the electronically controlled plunger configured to retract in response to the sensor detecting the liquid; and
    an actuating system in mechanical communication with the electronically controlled plunger and in mechanical communication with the valve, the actuating system comprising a lever, a release latch, and an energy storage device, wherein the retracting of the electronically controlled plunger causes the release latch to disengage from the lever, wherein the energy storage device is configured to store energy when the valve is in the open position and release energy to cause the lever to transition from a first position to a second position to close the valve when the release latch disengages from the lever.

2. The valve assembly of claim 1, further comprising a controller configured to:
    receive a signal from the sensor indicating the presence of the liquid; and
    output a signal to the electronically controlled plunger to retract.

3. The valve assembly of claim 1, further comprising a sound device configured to emit an audible alarm in response to the sensor detecting the presence of the liquid.

4. The valve assembly of claim 1, wherein the sensor is disposed proximate the base of the liquid storage device.

5. The valve assembly of claim 1, wherein the electronically controlled plunger is battery powered.

6. The valve assembly of claim 1, wherein the electronically controlled plunger comprises a solenoid.

7. The valve assembly of claim 1, wherein the energy storage device comprises at least one of a torsion spring, a tension spring, or a compression spring.

* * * * *